US008650487B2

(12) United States Patent
Chaney

(10) Patent No.: US 8,650,487 B2
(45) Date of Patent: Feb. 11, 2014

(54) SYSTEM AND METHOD OF PROVIDING FOR THE CONTROL OF A MUSIC PLAYER TO A DEVICE DRIVER

(75) Inventor: Jeremy P. Chaney, Seattle, WA (US)

(73) Assignee: Intel Corporation, Santa Clara, CA (US)

(*) Notice: Subject to any disclaimer, the term of this patent is extended or adjusted under 35 U.S.C. 154(b) by 97 days.

(21) Appl. No.: 13/013,679

(22) Filed: Jan. 25, 2011

(65) Prior Publication Data
US 2011/0154202 A1 Jun. 23, 2011

Related U.S. Application Data

(63) Continuation of application No. 11/823,097, filed on Jun. 25, 2007, now abandoned, which is a continuation of application No. 09/577,257, filed on May 22, 2000, now Pat. No. 7,237,198.

(51) Int. Cl.
G06F 3/00 (2006.01)
(52) U.S. Cl.
USPC .......................................... 715/717; 715/720
(58) Field of Classification Search
USPC ......... 715/717–720, 773, 810, 839, 841, 210; 720/718; 90/717–720, 773, 810, 839, 90/841
See application file for complete search history.

(56) References Cited

U.S. PATENT DOCUMENTS

| 5,559,301 | A |   | 9/1996 | Bryan, Jr. et al. |
| 5,655,006 | A | * | 8/1997 | Cox et al. ..................... 379/67.1 |
| 5,656,790 | A |   | 8/1997 | Adachi |
| 5,711,672 | A | * | 1/1998 | Redford et al. ........... 434/307 R |
| 5,761,519 | A | * | 6/1998 | Wada et al. .................... 713/330 |
| 5,773,741 | A |   | 6/1998 | Eller et al. |
| 5,831,613 | A |   | 11/1998 | Johnston et al. |
| 5,832,298 | A |   | 11/1998 | Sanchez et al. |
| 5,864,868 | A | * | 1/1999 | Contois ................................. 1/1 |
| 5,902,947 | A |   | 5/1999 | Burton et al. |

(Continued)

FOREIGN PATENT DOCUMENTS

| EP | 0747877 A2 | 12/1996 |
| EP | 0982732 A1 | 3/2000 |

OTHER PUBLICATIONS

Sony, "Operating Instructions for Compact Disc Compact Player model No. D-9", pp. 1-9, copyright Sony Corporation 1989.*

(Continued)

Primary Examiner — Omar Abdul-Ali
Assistant Examiner — Andrew Tank
(74) Attorney, Agent, or Firm — Stoel Rives LLP

(57) ABSTRACT

A system and method of providing for the control of a music player to a device driver. One embodiment of the system comprises an electronic music player that is connected to a plurality of music renderers via device drivers via a music renderer controller. The music renderer controller comprises a device integration application program interface for providing a standard interface for communicating with each of the device drivers. Each of the device drivers manage a selected music renderer. The device drivers can display a graphical interface for displaying notifications, customized controls, links to websites, or any other type of information desired by the manufacturer of the device driver. The device drivers can also customize the interfaces of the music render to rename textual elements that are displayed by the device driver. Furthermore, the device drivers can command the music player to suspend and resume playback of music items during selected periods.

15 Claims, 6 Drawing Sheets

(56) References Cited

U.S. PATENT DOCUMENTS

| | | | |
|---|---|---|---|
| 5,908,997 A | 6/1999 | Arnold et al. | |
| 5,911,044 A | 6/1999 | Lo et al. | |
| 5,974,004 A | 10/1999 | Dockes et al. | |
| 6,115,531 A | 9/2000 | Yanagihara | |
| 6,118,450 A | 9/2000 | Proehl et al. | |
| 6,148,346 A | 11/2000 | Hanson | |
| 6,172,948 B1 | 1/2001 | Keller et al. | |
| 6,192,340 B1* | 2/2001 | Abecassis | 704/270 |
| 6,243,725 B1* | 6/2001 | Hempleman et al. | 715/210 |
| 6,248,946 B1 | 6/2001 | Dwek | |
| 6,288,716 B1 | 9/2001 | Humpleman et al. | |
| 6,301,638 B1 | 10/2001 | Suzuki et al. | |
| 6,345,279 B1 | 2/2002 | Li et al. | |
| 6,356,971 B1 | 3/2002 | Katz et al. | |
| 6,366,914 B1* | 4/2002 | Stern | 1/1 |
| 6,377,530 B1 | 4/2002 | Burrows | |
| 6,385,386 B1 | 5/2002 | Aotake | |
| 6,393,430 B1 | 5/2002 | Van Ryzin | |
| 6,417,869 B1* | 7/2002 | Do | 715/718 |
| 6,441,830 B1 | 8/2002 | Duvall et al. | |
| 6,449,226 B1 | 9/2002 | Kumagai | |
| 6,452,609 B1 | 9/2002 | Katinsky et al. | |
| 6,462,753 B1 | 10/2002 | Koyata et al. | |
| 6,577,735 B1 | 6/2003 | Bharat | |
| 6,594,740 B1 | 7/2003 | Fukuda | |
| 6,671,567 B1 | 12/2003 | Dwyer et al. | |
| 6,772,212 B1 | 8/2004 | Lau et al. | |
| 6,892,350 B1 | 5/2005 | Oba et al. | |
| 7,020,704 B1 | 3/2006 | Lipscomb et al. | |
| 7,237,198 B1 | 6/2007 | Chaney | |
| 7,500,192 B2 | 3/2009 | Mastronardi | |
| 2002/0055934 A1 | 5/2002 | Lipscomb et al. | |
| 2002/0194260 A1* | 12/2002 | Headley et al. | 709/203 |
| 2003/0037068 A1* | 2/2003 | Thomas et al. | 707/200 |
| 2008/0134051 A1 | 6/2008 | Chaney | |

OTHER PUBLICATIONS

Office Action mailed Nov. 8, 2002 in U.S. Appl. No. 09/577,257, filed May 22, 2000.

Office Action mailed Jun. 23, 2003 in U.S. Appl. No. 09/577,257, filed May 22, 2000.

Office Action mailed Feb. 3, 2004 in U.S. Appl. No. 09/577,257, filed May 22, 2000.

Office Action mailed Nov. 22, 2004 in U.S. Appl. No. 09/577,257, filed May 22, 2000.

Notice of Allowance mailed Feb. 27, 2007 in U.S. Appl. No. 09/577,257, filed May 22, 2000.

Office Action mailed Apr. 27, 2010 in U.S. Appl. No. 11/823,097, filed Jun. 25, 2007.

* cited by examiner

SYSTEM AND METHOD OF PROVIDING FOR THE CONTROL OF A MUSIC PLAYER TO A DEVICE DRIVER

RELATED APPLICATIONS

This patent is related to U.S. patent application Ser. No. 09/550,545, entitled "System and Method of Providing Music Items to Music Renderers" filed on Apr. 14, 2000, which is hereby incorporated by reference, in its entirety.

BACKGROUND OF THE INVENTION

1. Field of the Invention

The field of the invention relates to music renderers. More particularly, the field of the invention relates to providing music items to music renderers.

2. Description of the Related Technology

With the advent of new music storage formats, such as MPEG Audio Layer 3 (MP3), the music industry has seen a remarked increase with respect to individuals using their home computer for playing music and individuals purchasing new types of music renderers, such as portable music devices, for playing music.

Using these new music storage formats, it is possible to shrink the sound data from sources such as a compact diskette (CD) without sacrificing sound quality. CDs typically render music at about 1400 kilobits per one second of stereo music. However, by converting data from a CD to another data format, such as MP3, the size of the data can be shrunk by a factor of about 12 without significantly sacrificing the quality of the music.

Many individuals use the Internet to find and download music in these new formats to their personal computer. At the personal computer, the user can, via a playback device program, play, edit, or copy the downloaded music. Furthermore, from the personal computer, the user can download the music to a portable music player so that the downloaded music can be played wherever the user travels. Portable music players, such as the Diamond Rio 500, allow individuals store up to two hours of digital-quality music and up to 32 hours of spoken audio programs. The Diamond Rio includes 64 MB onboard memory, expandable to 96 MB with removable flash cards.

Most music players provide a certain core group of features, such as playing and recording music. However, other than the core group, it is difficult to predict all of the features that will be supported by the music players. As hypothetical examples, optional features can include: providing compact diskette "burning", providing storage library hierarchies for music items, associating notes with music items, etc. Thus, since these features are not anticipated, the features are not supported by many legacy playback device programs.

To overcome this problem, as new features are introduced, the playback device programs are redesigned by the provider of the playback device program to provide support for the new features. Disadvantageously, the redesign takes time. Furthermore, the new version of the music player must be transmitted to the user. Both of these events are an inconvenience for the user.

Thus, there is a need for a music player that can take advantage of newly developed features of music renderers. Furthermore, the music player should not have to be redesigned to support the new features.

SUMMARY OF THE INVENTION

One embodiment of the invention comprises a method of providing a customized graphical interface, the method comprising executing a music player that displays a graphical interface comprising information about music items, and displaying a customized graphical interface for managing the music items, wherein the content of the customized graphical interface is defined by a device driver for a music renderer, and wherein the displaying of the customized graphical interface is in response to an event occurring during the execution of the music player.

Another embodiment of the invention comprises a system for providing a customized graphical interface, the system comprising a music player for displaying one or more graphical interfaces that comprise information about music items, a music renderer, and a device driver for sending music items to the music renderer, wherein the device driver displays a customized graphical interface for managing the music items, and wherein the content of the customized graphical interface is defined by the device driver.

Another embodiment of the invention comprises a system for providing a customized graphical interface, the system comprising means for executing a music player that displays a graphical interface comprising information about music items, and means for displaying a customized graphical interface for managing the music items, wherein the content of the customized graphical interface is defined by a device driver for a music renderer, and wherein the displaying of the customized graphical interface is in response to an event occurring during the execution of the music player.

Another embodiment of the invention comprises a method of providing a customized graphical interface, the method comprising executing a music player that displays a graphical interface comprising information about a plurality of music items, wherein the graphical interface comprises one or more textual elements describing an aspect of the music player, and receiving a request from a device driver to change the textual element.

Another embodiment of the invention comprises a system for providing a customized graphical interface, the system comprising a music player displaying a graphical interface comprising information about a plurality of music items, wherein the graphical interface comprises one or more textual elements describing an aspect of the music player, the music player adapted to receive requests from a device driver to rename the textual elements.

Another embodiment of the invention comprises a method of controlling a music player, the method comprising executing a music player that plays music items upon a request from a user, receiving a request from a device driver to disallow playback of the music items, and suspending playback of the music items on the music player.

DETAILED DESCRIPTION OF EMBODIMENTS OF THE INVENTION

The following detailed description is directed to certain specific embodiments of the invention. However, the invention can be embodied in a multitude of different ways as defined and covered by the claims. In this description, reference is made to the drawings wherein like parts are designated with like numerals throughout.

Figure 1:
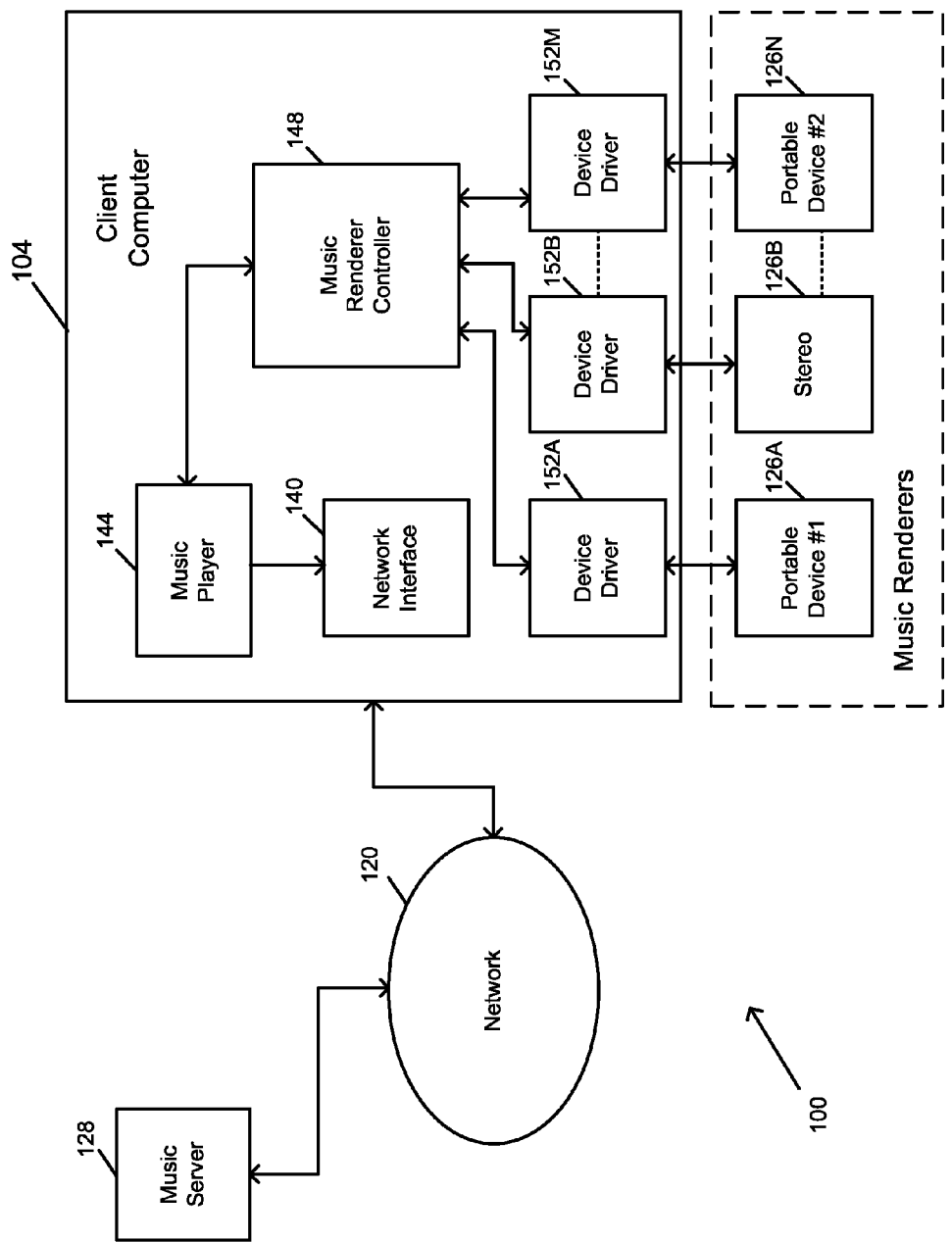
FIG. 1 is a high level block diagram illustrating one embodiment of a network configuration that may be used in connection with a music system, the music system comprising a server computer, a client computer, a music player, a music renderer controller, a plurality of music renderers, and a plurality of the device drivers that are associated respectively with selected ones of the music renderers.

Referring to FIG. 1, an exemplary network configuration 100 of the music system of the present invention will be described. A user communicates with a computing environment which may include a client computer 104, a network 120, music renderers 126A-126N, and a music server 128. The client computer 104 and each of the music renderers 126A-126N has an associated input and output device. For example, the input device may be a keyboard, rollerball, pen and stylus, mouse, voice recognition system, or predesignated switches or buttons. The input device may also be a touch screen associated with an output device. The user may respond to prompts on the display by touching the touch screen. Textual or graphic information may be entered by the user through the input device. The output device can comprise a speaker, a display screen, a printer, or a voice synthesizer.

The client computer 104, the music server 128, and the music renderers 126A-126N may each have any conventional general purpose single- or multi-chip microprocessor such as a Pentium® processor, a Pentium® Pro processor, a 8051 processor, a MIPS® processor, a Power PC® processor, or an ALPHA® processor. In addition, the microprocessor may be any conventional special purpose microprocessor such as a digital signal processor. Furthermore, the client computer 104, the music server 128, and each of the music renderers 126A-126N may each be used in connection with various operating systems such as: UNIX, LINUX, Disk Operating System (DOS), VxWorks, PalmOS, OS/2, Windows CE, Windows 3.X, Windows 95, Windows 98, and Windows NT.

The music renderers 126A-126N can comprise a stationary device, such as a stereo system, or, alternatively, a portable device, such as a Diamond RIO, a RCA Lyra, a portable radio, or a personal display adapter.

Still referring to FIG. 1, the client computer 104 comprises a network interface 140, an electronic music player 144, a music renderer controller 148, and device drivers 152A-152M. The network interface 140 communicates with a control program of the music server 128 via the network 120. As is discussed in further detail below, using the music player 144, a user can communicate with the music server 128 to download and play songs via the output device of the client computer 104. Furthermore, using the electronic music player 144, a user can organize the songs according to subject matter and also download the songs to one of the music renderers 126A-126N. As defined herein, a device driver is a software program, module, procedure, or executable, that is capable of communicating with a music renderer, the device driver being adapted to "plug-in" and be operably connected to the music player 144.

The music renderer controller 148 controls communications between the music player 144 and the device drivers 152A-152M. The music renderer controller 148 comprises a device integration application program interface (DIAPI) that provides a predefined interface for communicating with the device drivers 152A-152M. Using the DIAPI, programmers can develop new device drivers 152A-152M for integration within the client computer 104. In one embodiment of the invention, the DIAPI is based upon the Component Object Model (COM), which was developed by Microsoft Inc. of Redmond Wash. The DIAPI is described in further detail below with reference to FIG. 3.

In one embodiment of the network configuration 100, the client computer 104 includes a network browser that is used to access the music server 128. In another embodiment of the invention, the music renderers 126A-126N includes a network browser and can connect directly to the network 120. A user that is accessing the client computer 104 may utilize the network browser to remotely access a control program that is executing at the music server 128. The user can electronically request, via the network browser, the music server 128 to transmit selected music items from the music server 128 to the client computer 104. The music items can either be a music track, a folder comprising multiple music tracks, or some other logical grouping of musical sounds. The electronic request from the client computer 104 (FIG. 1) can correspond to one of any number of network protocols. In one embodiment of the invention, the electronic request comprises a Hypertext Transfer Protocol (HTTP) request. However, it is to be appreciated that other types of network communication protocols may be used.

It is noted that although only one client computer 104 and three music renderers 126A-126N are shown in FIG. 1, the network configuration 100 can include large numbers of such devices, e.g., millions. It is also noted that only one music server 128 is shown, the network configuration 100 can include a large number of such servers. Furthermore, the music server 128 can include a number of computers that work collaboratively to provide music in response to requests from the client computer 104.

The network 120 may include any type of electronically connected group of computers including, for instance, the following networks: a virtual private network, a public Internet, a private Internet, a secure Internet, a private network, a public network, a value-added network, an intranet, and the like. In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). The network 120 may connect to the client computer 104, for example, by use of a modem or by use of a network interface card that resides in the client computer 104.

As can be appreciated by one of ordinary skill in the art, the control program of the music server 128, the network interface 140, the music player 144, the music renderer controller 148, and the device drivers 152A-152M may each comprise various sub-routines, procedures, definitional statements, and macros. Each of the foregoing modules may be separately compiled and linked into a single executable program. However, it is to be appreciated by one of ordinary skill in the art that the processes that are performed by selected ones of the modules may be arbitrarily redistributed to one of the other modules, combined together in a single module, made available in a shareable dynamic link library, or partitioned in any other logical way. For example, in one embodiment of the invention, the music player 144 and the music renderer controller 148 are integrated into a single executable module.

Furthermore, for example, in another embodiment, the device drivers 152A-125N are maintained in a dynamic link library that is separate from the music player 144 and the music renderer controller 148.

Furthermore, the control program of the music server 128, the network interface 140, the music player 144, the music renderer controller 148, and the device drivers 152A-152M may be written in any programming language such as C, C++, BASIC, Pascal, Java, and FORTRAN and ran under the well-known operating system. C, C++, BASIC, Pascal, Java, and FORTRAN are industry standard programming languages for which many commercial compilers can be used to create executable code. Furthermore, the control program of the music server 128, the network interface 140, the music player 144, the music renderer controller 148, and the device drivers 152A-152M can be either an "application program", reside as part of the operating system for the device, or can reside partly in both.

Figure 2:
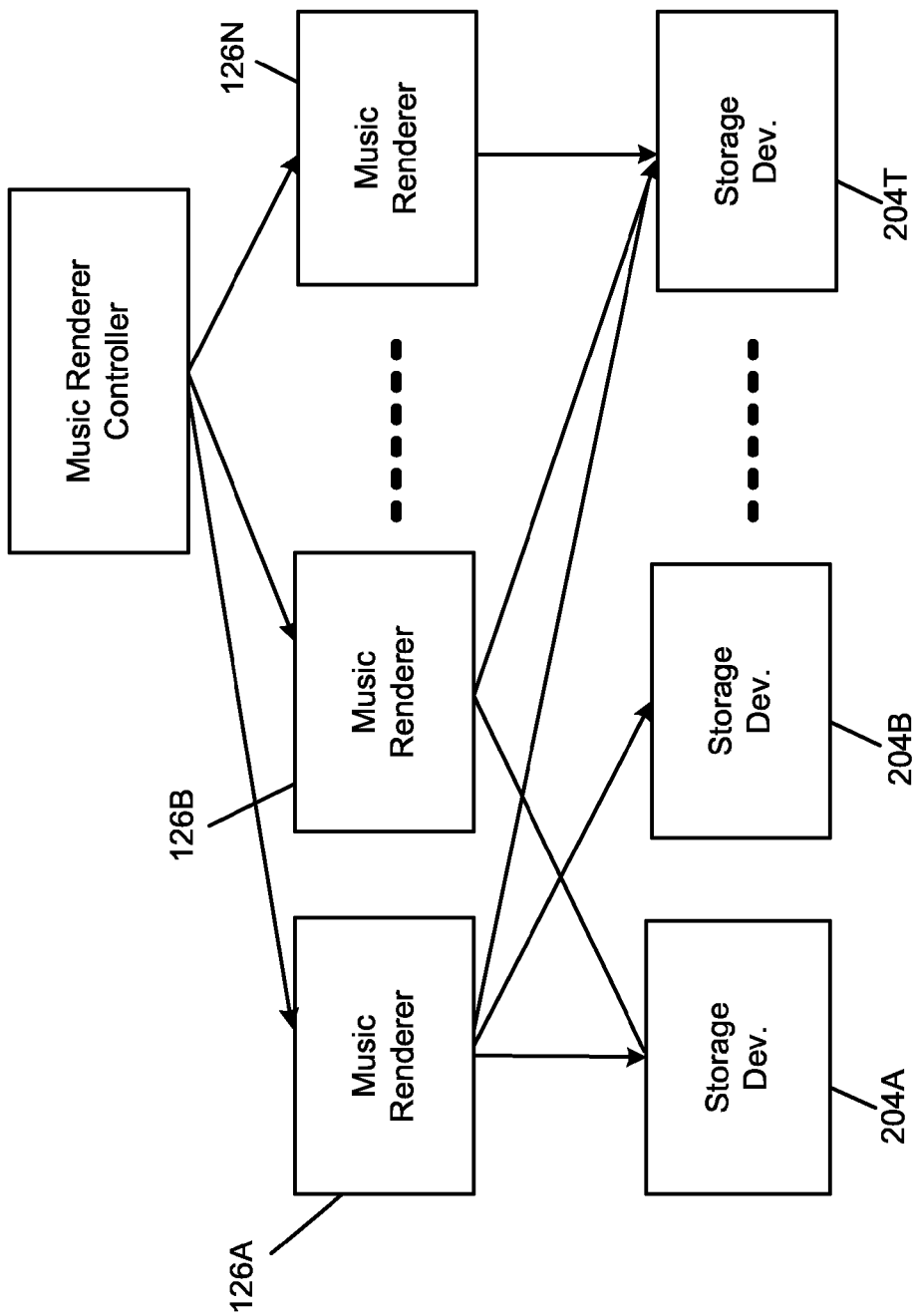
FIG. 2 is block diagram illustrating the relationship between the music renderers of FIG. 1 and a plurality of storage devices that are associated with the music renders.

FIG. 2 is a block diagram illustrating the relationship between the music renderers 126A-126N and a plurality of storage devices 204A-204T. The storage devices 204A-204T may be integrated with one or more of the media renderers 126A-126N or alternatively, connected directly or indirectly to the client computer 104. For example, the storage devices 204A-204T can comprise non-volatile random access memory, flash memory, or a mass storage, such as is found in a hard drive.

In one embodiment of the invention, each of the storage devices 204A-204T is associated with a device object, e.g., one of the device drivers 152A-152M. Furthermore, in this embodiment, each of the storage devices 204A-204T is associated with a storage object. The device object defines an interface for transmitting music items to the music renderer. The storage object defines an interface for performing storage functions on the associated storage device.

Figure 3:
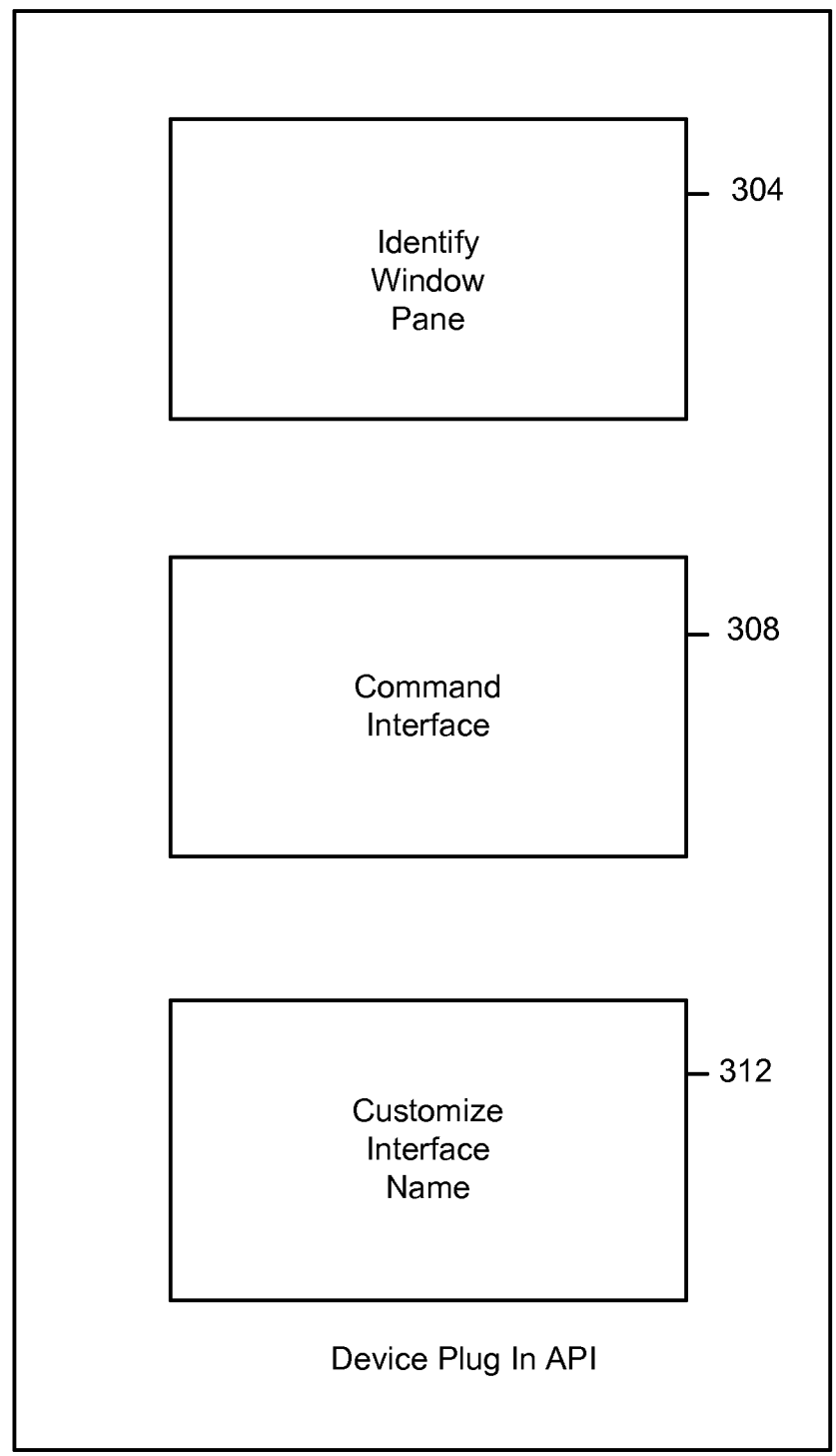
FIG. 3 is a block diagram illustrating a plurality of interfaces between the music controller of FIG. 1 and each of the device drivers of FIG. 1.

FIG. 3 is a block diagram illustrating certain API's of the device drivers 152A-152M. Using the API's, the music renderer controller 148 can communicate with the device drivers 152A-152N. Since the API's are predefined and may be made publicly available, a device manufacturer can develop music renderers and device drivers for integration and connection to the music renderer controller 148 and the music player 144.

As is shown in FIG. 3, each of the device drivers 152A-152M provides one or more of the following interfaces: a window pane interface 304, a command interface 308, and a customize interface name interface 312. By invoking or "calling" one of the entry points, the music renderer controller 148 and the device drivers 152A-152M can communicate with each other. It is noted that depending on the embodiment, the device drivers 152A-152M may have additional or fewer interfaces than are illustrated in FIG. 3.

A device driver may invoke the identify window interface 304 to provide the music player 144 a pointer to a window object. The music player 144 may invoke the window object to perform various functions on a graphical interface, e.g., window, such as requesting the music player 144 to resize the graphical interface, hide the graphical interface, or display the graphical interface. Advantageously, a device driver can seamlessly integrate any new control, notification, windows into the music renderer that, depending on the features of the music renderer, may be required.

For example, if desired, the device driver can implement and display a general information window. The general information window may comprise general information about a music renderer and contains "links" to additional information about the music renderer. The generation information window could also provide contact information for obtaining support for the music renderer. As other non-limiting examples, the device driver can display the following information: statistical information about the music renderer, advertisements, technical information, and flight recorder logs of past actions.

Furthermore, for example, the device driver can provide controls for the music renderer. As non-limiting examples, the device driver can provide: searching capabilities for music items, associate notes with music items, and advanced editing controls.

The music player 144 invokes the window(s) that are provided by the device drivers 152A-152M upon the occurrence of pre-defined events. As examples, the events can include: receiving a request to transmit a music item to one of the music renderers, the passage of a predetermined period of time, and receiving the request of a user.

Referring again to FIG. 3, a device driver may invoke the command interface 306 to send one or more predefined commands to the music player. In one embodiment of the invention, the predefined commands include enabling playback and disabling playback. Advantageously, a device driver can inform the music player 144 of its intentions. For example, the process of "burning" a compact diskette is very time intensive and if the process is interrupted, the resulting audio compact diskette becomes useless. Using the command interface 306, a CD-burning device driver can inform the music player 144 that the CD burner is about to start a burn and that the music player 144 should stop and disable playback of all music until the process is complete.

A device driver may invoke the customize interface name interface 312 to customize any button, control, or textual element that is displayed by the music generator. For example, a button for "begin transfer" does not describe the process of burning a CD. Thus, the device driver for the CD burner can rename the button to something more descriptive such as "begin CD burn." In one embodiment of the invention, to prevent a renaming conflict between two of the device drivers, each of the device drivers can only rename those buttons, controls, or textual elements that are associated with transmitting data to and from the music renderer that is controlled by the device driver.

Figure 4:
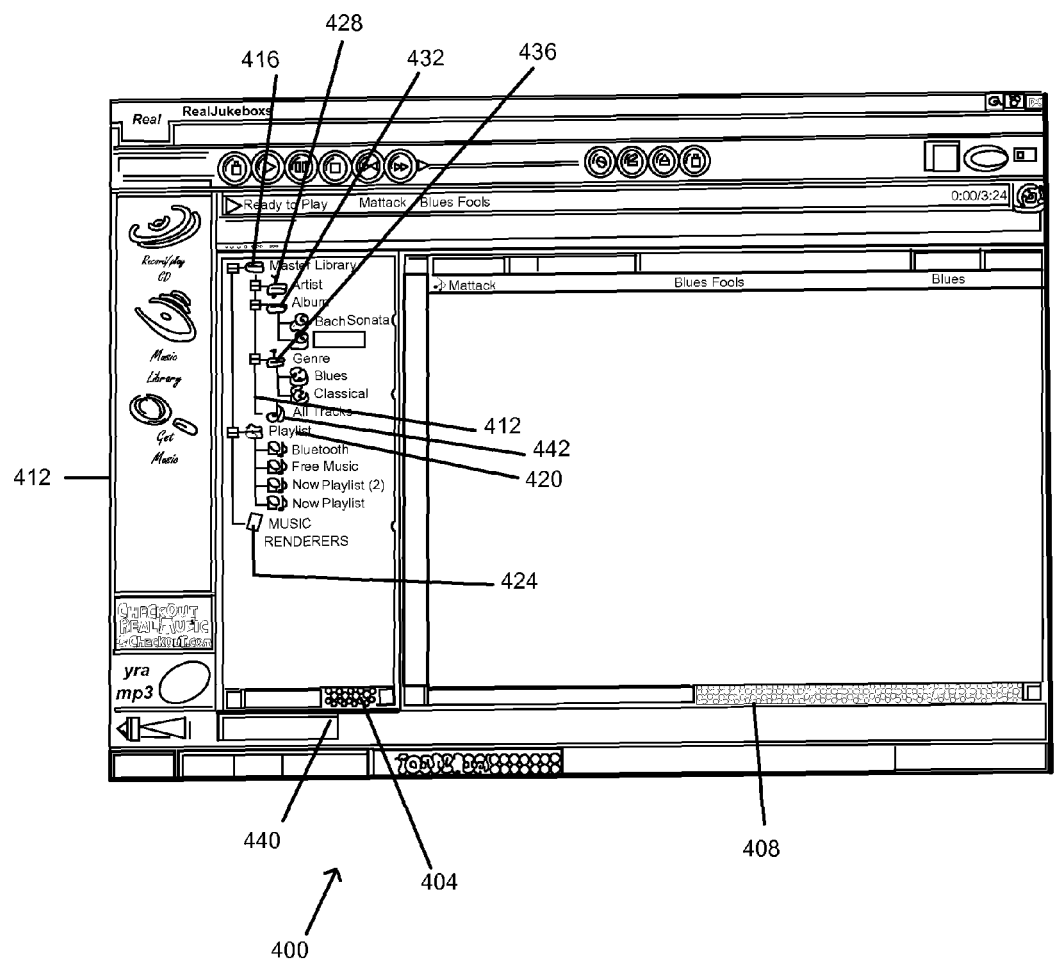
FIG. 4 is a screen display illustrating an exemplary control panel for organizing the music items that are maintained by the client computer of FIG. 1.

FIG. 4 is an exemplary screen display 400 that is presented to a user by the music player 144 (FIG. 1) via an output device of the client computer 104. Using the screen display 400, a user may: (i) play music that resides either on the client computer 104 or one of the music renderers 126A-126N; (ii) copy or move music items from the client computer 104 to one of the music renderers 126A-126N; (iii) copy or move music items from one of the music renderers 126A-126N to the client computer 104; (iv) copy or move music items from one music renderer to another music renderer; (v) install new music renderers; (vi) organize music into playlists; and (vii) download music from the music server 128 (FIG. 1).

The screen display 400 includes a library window 404 and an information window 408. The library window 404 includes a hierarchical graphical library tree 412 that organizes and classifies the music on the client computer 104 and the music renderers 126A-126N. The hierarchical graphical library tree 412 is comprised of a plurality of graphical nodes, each of the nodes (except root nodes) having one parent node and zero or more children nodes. Each of the nodes has an associated icon and/or text that is displayed to the user. The icon and/or text of a node identifies a classification that is associated with each of the children of the node. For example, as is described in further detail below, a node can be used to group music items according to author, album, or subject matter.

In one embodiment of the invention, the hierarchical graphical library tree 412 includes three root nodes, namely, a master library node 416, a playlist node 420, and a music renderer node 424. Furthermore, in one embodiment, the master library node 416 has four children, namely, an artist node 428, an album node 432, a genre node 436, and an all tracks node 442. The children of the artist node 428 are nodes that identify the names of various authors. For example, as is shown in FIG. 4, the user has music tracks from two different authors: Anastasia Khitul and the Blues Fools. By selecting one of the children nodes of the artist node 428, the user is presented via the information window 408 a list of all of the tracks that are associated with the selected artist.

The children of the album node 432 are nodes that identify the names of each of the albums that are maintained by the music player 144. As defined herein, an album is association of music or sound tracks. By selecting one of the children nodes of the album node 428, the user is presented via the information window 408 a list of all of the tracks that are associated with the selected album.

The children of the genre node 436 identify the names of one or more genres of music. For example, the children of the genre node 436 can include: blues, classical, rock and roll, country, hip hop, etc. Upon selecting one of the children nodes of the genre node 428, the user is presented in the information window 408 a list of all of the tracks that are associated with the selected genre.

Upon selecting the all tracks node 442 of the genre node 428, the user is presented in the information window 408 a list of all of the tracks that are maintained by the music player 144.

The playlist node 420 has as its children each of the playlists that have been created by the user of the client computer 104. As defined herein, a playlist is defined as a logical grouping of songs. Upon selecting one of the children nodes of the playlist node 420, the user is presented in the information window 408 a list of all of the tracks that are associated with playlist. The user can select a particular playlist and request the music player 144 to render each of the tracks that are associated with the playlist.

Upon selecting a new playlist button 440, the music player 144 enters a playlist mode wherein the user is allowed to prepare a new playlist, the new playlist associating together selected tracks that are maintained by the music player 144.

The music renderer node 424 has as its children a group of nodes that are each respectively labeled with the names of the music renderers 126A-126N. Upon selecting one of the children nodes of the music renderer node 424, the user is presented in the information window 408 a list of all of the tracks that are maintained by the selected music renderer.

Using one of the input devices of the client computer 104, the user can copy or move one of the nodes and all of the descendants of that node from a first part of the hierarchical graphical library tree to another. For example, the user can move all of the tracks that are associated with a blues genre node to a portable device. Furthermore, for example, the user can copy a playlist from the client computer 104 to one of the music renderers 126A-126N by selecting the playlist and "dragging" the playlist via one of the input devices of the client computer 104 to one of children of the music renderer node 424. As is appreciated by one of ordinary skill in the art, the term dragging refers to manipulating a graphical object on a display from a first location to a second location.

Figure 5:
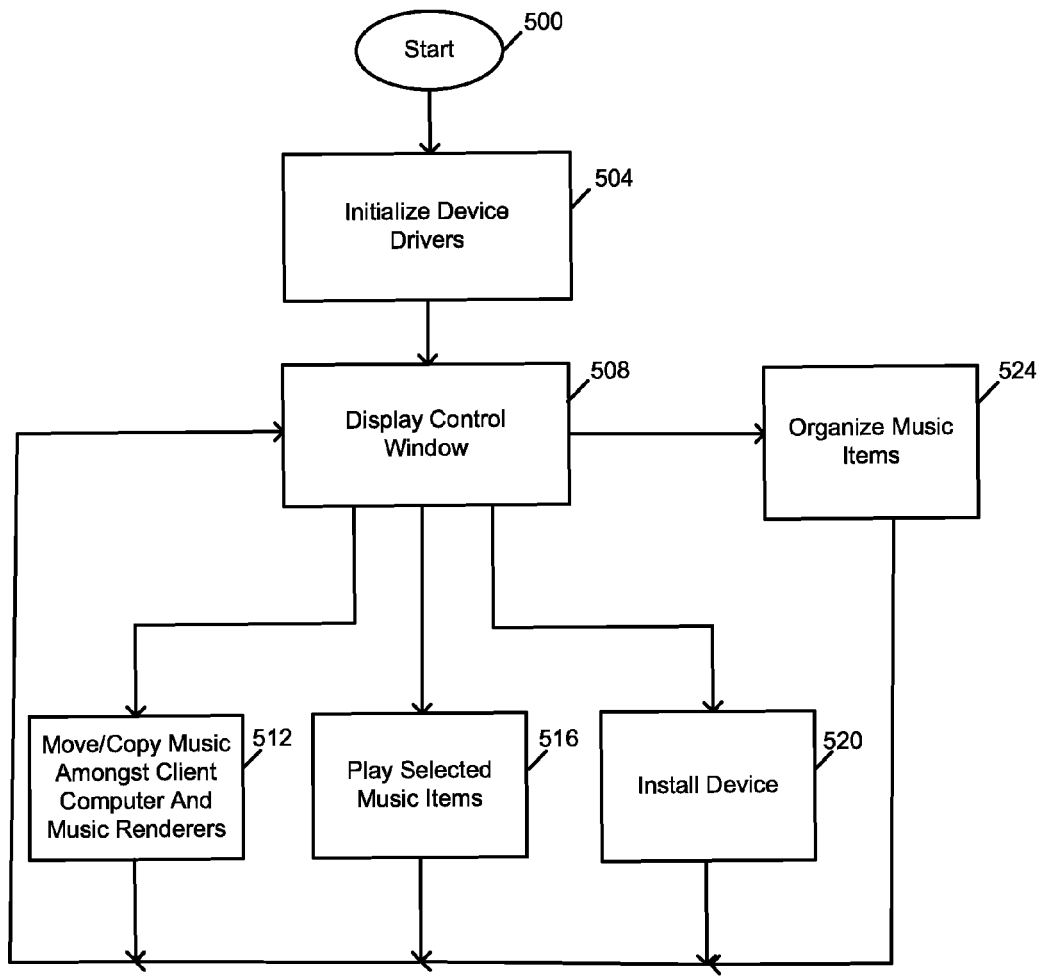
FIG. 5 is a flowchart illustrating a process of utilizing the music player of FIG. 1.

FIG. 5 is a high level flowchart illustrating a process for managing music items on the music renderers 126A-126N. Before starting at a start step 500, the user has executed the music player 144. The music player 144 communicates with the music renderer controller 148 to request that all of the music renderers be initialized. After starting at a step 500, the music renderer controller 148 proceeds to a step 504. At the step 504, the music renderer controller 148 initializes any pre-registered device drivers.

Next, at a step 508, the music player 144 displays to a user a control window, such as is shown in FIG. 4. The control window allows the user to perform various acts with respect to the music items that are stored on the client computer 104 and on the music renderers 126A-126N. From the step 508, the music player 144 can, depending on the user's preference, proceed to either the steps 512, 516, 520, or 524. At the step 512, the user can move or copy music tracks amongst the client computer 104 and the music renderers 126A-126N. For example, the user can: (i) move or copy one or more selected music items from the client computer 104 to one of the music renderers 126A-126N; (ii) move or copy one more selected music items from one music renderer to another music renderer; or (iii) more or copy music items from one of the music renderers 126A-126N to the client computer.

Figure 6:
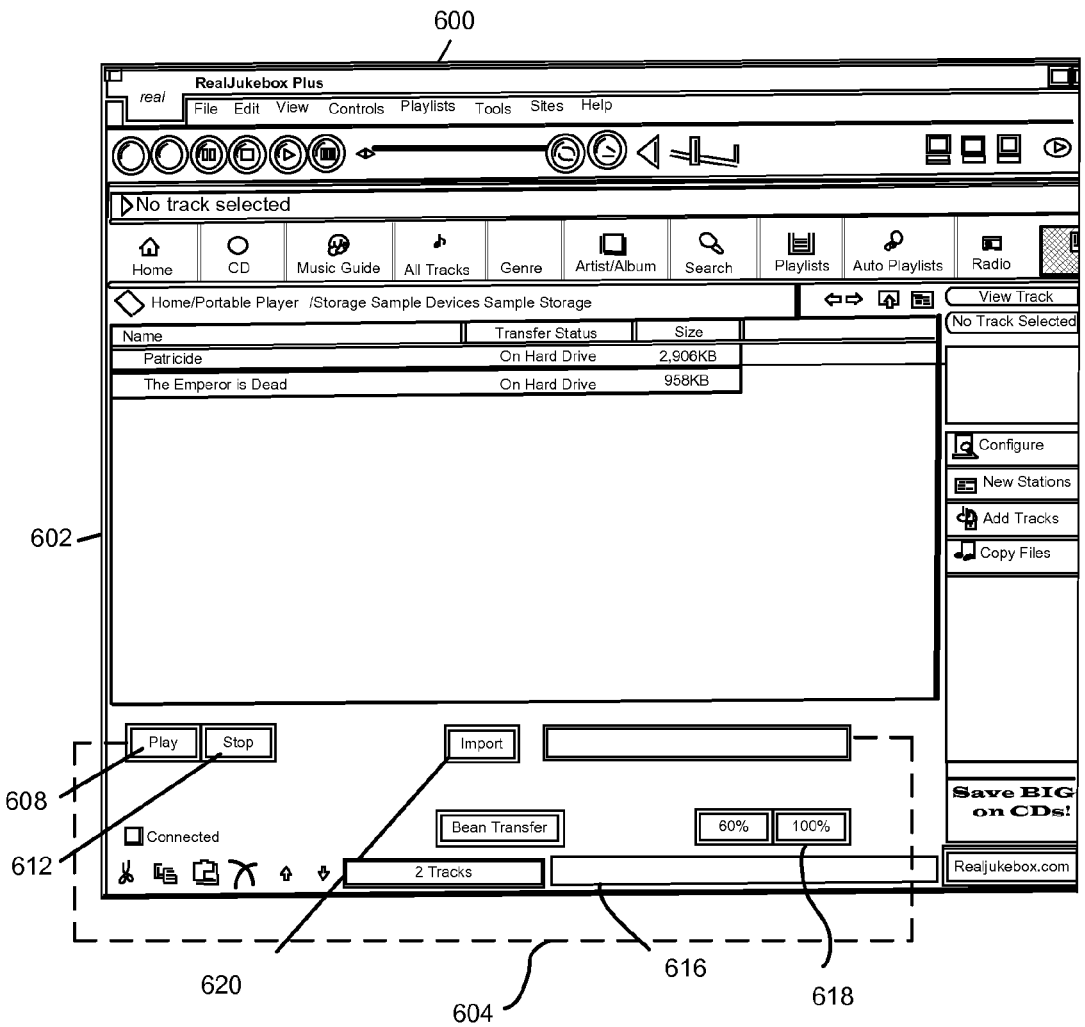
FIG. 6 is a screen display illustrating an exemplary customized window that is displayed by one of the device drivers of FIG. 1.

In one embodiment of the invention, upon requesting to transfer music items to or from one of the music renders, a transfer screen 600, such as is shown in FIG. 6 is displayed to the user.

The transfer screen 600 comprises a music transfer window 602 and a control portion 604. The music transfer window 602 lists the music items that are stored in a mass storage device on the client computer 104. Using an input device, one or more of the music items shown in the music transfer window 602 may be selected by the user.

The control portion 604 is maintained by the device driver for the respective window. By utilizing the identify window pane interface 304 (FIG. 3), the device driver for the respective music renderer can display customized control icons for the music renderer. It is noted that the identify window pane interface 304 can be used in other contexts with respect to the music renderer and the music player 144.

As is shown for exemplary purposes in FIG. 6, the control portion 604 comprises a play button 608, a stop button 612, a begin transfer button 616, re-size window buttons 618, and an import button 620. Selecting the play button 604 starts playback of a selected music item shown in the music transfer window 602. Selecting the stop button stops playback of the selected music item. Selecting begin transfer button 616 begins the transfer of data from the mass storage device to the music render. Selecting the resize window buttons 618 causes the size of the control portion 604 to be increased or decreased. Selecting the import button 620 allows the user to import a music item from a selected location in the client computer 144. The buttons, text, and fields, shown in the control portion 622 are for exemplary purposes, and that each device driver can customize the control portion depending on the requirement of the music renderer that is being managed by the device driver.

Furthermore, a device driver can customize the text that is shown by the music player 144. For example, in one embodiment of the invention, during the transfer of a music item from the client computer 144 to one of the music renderers 126A-126N, the state of the transfer is displayed to the user. By invoking the customize interface name interface 312, the device driver can rename the description of the state Upon copying the music items to a selected music renderer, the music items are automatically transcoded and transcrypted depending on the requirements of the selected music renderer. For example, assume the user desires to copy one or more music items from the client computer 104 to the music renderer 126B. Furthermore, assume the client computer 104 maintains the music items as MP3 format and the music renderer 126B stores music items according to a proprietary format. The user indicates his desire for copying the selected music items by dragging the selected music items to the respective node of the music renderer in the hierarchical classification tree 412 (FIG. 4). If the music item should be converted, the device driver reformats the music items to the appropriate format and transmits the formatted music item to the respective device driver for the selected music renderer 126B. It is noted that if the music items was a group of music tracks, i.e., a folder, the music player 144 formats each of the music tracks within the group before transmitting the tracks to the device driver. The device driver then stores the tracks according to any preferences that have been specified by the user, e.g., with or without lyrics, with graphical icons, etc. The process flow then returns to the step 508, whereby the user can select another option, or alternatively, stop the music player 144.

Referring again to the step 508 (FIG. 5), if the user requests to play one of the music items, the process flow proceeds to a step 516. At the step 516, the music player 144 plays via an output device of the client computer 104 one or more music items that have been selected by the user. The process flow then returns to the step 508, whereby the user can select another option, or alternatively, stop the music player 144.

Referring again to the step 508, if the user requests to install a new device, the process flow proceeds to a step 520. At the step 520, the user can request to install a new music renderer. In one embodiment of the invention, upon the request to install a new music renderer, the user is provided a list of music renderers that are supported by the music player 144. In this embodiment, the music player 144 may automatically or, alternatively, upon a user request, retrieve a list of music renderers that are supported by the music player 144. Upon the selection of a music renderer, the music player 144 identifies the location of a device driver for the selected music renderer. The location of the device driver for the selected music renderer can either be provided by the user or alternatively be maintained by the music server 128.

In one embodiment, if the device driver is not on the client computer 104, the client computer 104 requests another computer that is connected to the network 120 to transmits the device driver to the client computer 104. In another embodiment, the music player 144 requests the user to insert program storage device, such as a compact diskette, so that the music player 144 may copy the device driver to the client computer 104.

Once the device driver is in the client computer 104, the device driver is dynamically linked to the music renderer controller 148. Furthermore, the music player 144 registers the device driver in an internal registry so that the music player 144 will initialize the device driver upon future invocations of the music player 144. The process flow then returns to the step 508, whereby the user can select another option, or alternatively, stop the music player 144.

At the step 524, the music player 144 enters a playlist mode that allows the user to organize the music items on the client computer 104 and the music renderers 208A-208N. The user can group selected music items into a playlist. The process flow then returns to the step 508, whereby the user can select another option, or alternatively, stop the music player 144.

Advantageously, by providing a music renderer controller 148 that is designed to communicate with device drivers by a predefined interface, i.e., the DIAPI, one or more new device drivers can be added at later date and can communicate with the music player 144. The interface to the music player 144 is independent on the particular characteristics of each of the music renderers 126A-126N.

The DIAPI of the music renderer controller 148 gives the music renderer manufacturers flexibility to define what actions can be performed with respect to the music renderer. Furthermore, by using the DIAPI, changes in firmware of one of the music renderers 126A-126N do not necessitate changes in the electronic music player 144. If additional features are provided with respect to one the music renderers 126A-126N, a new device driver may be created to communicate with the music renderer controller 148 and thereby allow the user to take advantage of such new features without requiring a re-design of the music player.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A computer implemented method of controlling an electronic media player, the method comprising:

executing an electronic media player on a computing device, the electronic media player initiating playback of a first media content item of a plurality of media content items via an output device of the computing device, the electronic media player providing a graphical user interface and a device driver interface that enables device drivers to modify the graphical user interface of the electronic media player;

receiving, at the user interface of the electronic media player on the computing device, a first request from a user, the first request directing an action to manage the plurality of media content items and being unrelated to suspending the playback of the first media content item;

receiving, at the device driver interface of the electronic media player on the computing device, a second request to suspend the playback of the first media content item by the electronic media player, wherein the device driver interface is operably connected to the electronic media player, wherein the second request is received at the device driver interface from a device driver, wherein the device driver is in communication with an external media renderer and configured to transmit media content items to the external media renderer, and wherein the device driver is adapted to removably couple to the device driver interface to operably connect to the electronic media player;

responsive to receiving the second request, suspending the playback of the first media content item by the electronic media player and altering the user interface of the electronic media player.

2. The method of claim 1, wherein the media content item is a music item.

3. The method of claim 1, wherein the device driver is a device driver for an optical diskette drive.

4. The method of claim 1, further comprising:

receiving at the device driver interface a third request from the device driver to allow the playback of the first media content item by the electronic media player to resume; and responsive to receiving the third request, the computer resuming the playback of the media content item.

5. The method of claim 1, wherein the media player is an application program.

6. The method of claim 1, wherein the action to manage the plurality of media content items comprises playing a second media content item of the plurality of media content items.

7. The method of claim 1, wherein the action to manage the plurality of content items comprises copying a media content item from a first location to a second location.

8. The method of claim 1, wherein the action to manage the plurality of media content items comprises recording a given media content item.

9. The method of claim 1, wherein the action to manage the plurality of media content items comprises adding a given media content item to a playlist.

10. The method of claim 1, wherein the output device of the computing device comprises a speaker.

11. The method of claim 1, wherein the first request originates from the user via an input device of the computing device.

12. The method of claim 1, wherein the first request is received at an input interface of the computing device.

13. The method of claim 1, wherein the first request is received from a remote media server coupled to the computing device via a network.

14. The method of claim 1, wherein the second request originates from the device driver in response to an action initiated on the external media renderer.

15. The method of claim 14, wherein the action initiated on the external media renderer comprises burning a compact diskette.

\* \* \* \* \*